United States Patent Office 3,336,363
Patented Aug. 15, 1967

3,336,363
DI(ALLYLOXYMETHYL) BUTYL ESTERS
Dale R. Dill, Webster Groves, Mo., assignor to Monsanto
Company, a corporation of Delaware
No Drawing. Filed May 18, 1964, Ser. No. 368,332
7 Claims. (Cl. 260—475)

This invention relates to a new class of chemical compounds. More particularly, the invention relates to novel di(allyloxymethyl)butyl esters of polycarboxylic acids. These compounds have been found to be useful as plasticizers for vinyl-halide containing resins.

The novel di(allyloxymethyl)butyl esters are selected from the group consisting of compounds of the formulae,

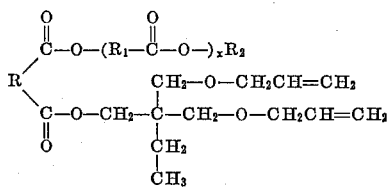

and

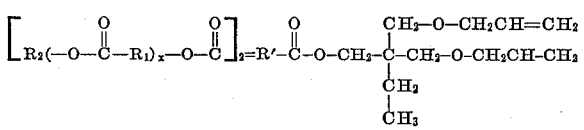

and

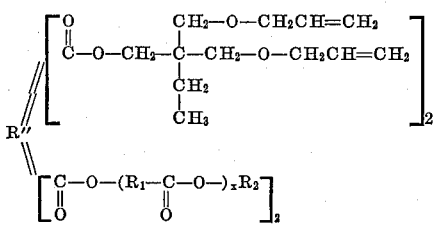

wherein:

R is a member of the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene;

R' is a member of the group consisting of phenenyl and 1-propen-1,2,3-yl;

R" is benzenetetrayl;

$R_1$ is alkylene of 1 to 4 carbon atoms;

$R_2$ is a radical selected from the group consisting of alkyl of 1 to 20 carbon atoms, phenyl, benzyl and alkyl substituted benzyl of 8 to 11 carbon atoms; and x is 0 to 1.

It is a primary object of this invention to provide novel di(allyloxymethyl)butyl esters of polycarboxylic acids.

A further object is to provide a novel class of di(allyloxymethyl)butyl esters of polycarboxylic acids which are useful as plasticizers for vinyl halide containing resins.

Other and different objects, features and advantages of this invention will become apparent to those skilled in the art upon consideration of the following detailed description thereof and the examples attendant thereto.

It has been found that the heretofore-described di(allyloxymethyl)butyl esters of polycarboxylic acids can be readily prepared by heating, in equimolar quantities, a polycarboxylic acid anhydride, 1,1,1,-trimethylol propane diallyl ether, a tertiary amine, and an alkyl halide, an aralkyl halide or an aliphatic, cycloaliphatic or aryl ester of a lower haloalkonoic acid.

The polycarboxylic acid anhydrides useful in the preparation of the novel compounds of this invention include succinic anhydride, substituted succinic anhydrides such as propylsuccinic anhydride, methylbutylsuccinic anhydride, hexylsuccinic anhydride, heptylsuccinic anhydride, tetrapropenylsuccinic anhydride, pentenylsuccinic anhydride, octenylsuccinic anhydride, nonenylsuccinic anhydride, α,β-diethylsuccinic anhydride and the like; glutaric anhydride, maleic anhydride; substituted maleic anhydrides such as chloromaleic anhydride and dichloromaleic anhydride; itaconic anhydride, citraconic anhydride, aconitic anhydride; tetrahydrophthalic anhydride, trimellitic anhydride; pyromellitic anhydride; phthalic anhydride, methyltetrahydrophthalic anhydride, hexachloroendomethylenetetrahydrophthalic anhydride, tetrabromophthalic anhydride, tetraiodophthalic anhydride, substituted phthalic anhydrides such as tetrachlorophthalic anhydride, 4-nitrophthalic anhydride, methylphthalic anhydride, ethylphthalic anhydride, propylphthalic anhydride, butylphthalic anhydride; naphthalic anhydrides such as 1,2-naphthalic anhydride, 1,8-naphthalic anhydride, 2,3-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, tetraphthalic acid, isophthalic acid, and the like. Also, other dicarboxylic acid anhydrides, useful in the preparation of polymerizable compositions, include the Diels-Alder adducts of maleic acid and aliphatic compounds having conjugated double bonds.

Tertiary amines suitable for use in preparing the compounds of this invention can be represented by the formula,

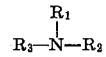

wherein $R_1$, $R_2$ and $R_3$ are like or unlike saturated aliphatic organic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimethyldecylamine and the like.

The alkyl halide reactant of this invention can be represented by YX, where Y is a straight or branched chain alkyl radical containing up to 20 carbon atoms, and X is a halogen atom such as chlorine, bromine and iodine atoms, with a preference in that order. It is preferred that YX be an alkyl halide containing 4 to 20 carbon atoms.

As illustrative of the preferred alkyl halide reactants of this invention are n-butyl chloride, n-butyl bromide, sec.-butyl chloride, n-amyl chloride, isoamyl chloride, sec.-amyl chloride, sec.-amyl iodine, n-amyl bromide, n-hexyl chloride, isohexyl chloride, sec.-hexyl chloride, 2-chlorohexane, n-heptyl chloride, isoheptyl chloride, 2-chloroheptane, n-octyl chloride, 1-bromooctane, n-octyl iodide, isooctyl chloride, 2-chlorooctane, 4-chlorooctane, 2-ethylhexyl chloride, 2-chlorononane, 3-chlorononane, n-decyl chloride, 2-chlorodecane, 3-chlorodecane, undecyl chloride, 2-chloroundecane, n-dodecyl chloride, n-dodecyl bromide, 2-chlorododecane, 2-bromododecane, 3-chlorododecane, tridecyl chloride, tetradecyl chloride, pentadecyl chloride, hexadecyl chloride, octadecyl chloride, octadecyl bromide, eicosyl chloride, and the various isomers thereof and various mixtures thereof, as, for example, those obtained upon monochlorinating alkane fractions obtained from petroleum. Particularly suitable alkanes are those obtained from petroleum fractions boiling at atmospheric pressure in the range of about 30° C. to about 300° C., such as a pentane cut from gasoline boiling from about 30° C. to about 40° C., a ligroin boiling from about 90° C. to about 120° C., a benzine boiling from about 120° C. to about 150° C., and a kerosene boiling from about 150° C. to about 235° C.

The aralkyl halides which can be used in the process of this invention are benzyl chloride, benzyl bromide and benzyl iodide, as well as the alkyl substituted benzyl halides, e.g., methylbenzyl chloride, methylbenzyl bromide, ethylbenzyl chloride, butylbenzyl chloride, dimethylbenzyl chloride and the like.

Aliphatic, cycloaliphatic and aryl esters of lower haloalkanoic acids which can be used in the process of the invention can be prepared from chloroacetic, iodoacetic, 3-chloropropionic, bromoacetic, 4-chlorobutyric acid and the like.

The invention will be more readily understood by reference to the following examples, which describe the detailed preparation of representative compounds. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

*Example 1*

To a suitable reaction vessel having means for the addition and removal of heat, means for measuring the temperature of the reaction mass, means for agitating the reaction mass, means for the addition and removal of solids and liquids, and fitted with a condenser, there is charged 98.1 grams (1.0 mol) of maleic anhydride and 226.0 grams (1.05 mols) of 1,1,1-trimethylol propane diallly ether. The mixture is heated to about 80° C., and 106.5 grams (1.05 mols) of trimethylamine is added. There is then added 208 grams (1.08 mols) of 1-bromooctane. The resultant reaction mixture is held at a temperature of about 115° C. for about two hours and then washed with several water and lye washes. The oil layer from the washing step is steam sparged and dehydrated at 121–125° C. at 20 mm. Hg. There is obtained 427.2 grams of octyl [2,2-di(allyloxymethyl)butyl]maleate.

*Examples 2–7*

Following the procedure of Example 1, 1.0 mol of each of the anhydrides tabulated is substituted for the maleic anhydride. The product obtained in each instance is as indicated.

(2) Anhydride=tetrapropenyl succinic anhydride
  Product=octyl[2,2 - di(allyloxymethyl)butyl]-tetrapropenyl succinate.
(3) Anhydride=chloromaleic anhydride
  Product=octyl[2,2 - di(allyloxymethyl)butyl]-chloromaleate.
(4) Anhydride=citraconic anhydride
  Product=octyl[2,2 - di(allyloxymethyl)butyl]-citraconate.
(5) Anhydride=chlorophthalic anhydride
  Product=octyl[2,2 - di(allyloxymethyl)butyl]-chlorophthalate.
(6) Anhydride=nitrophthalic anhydride
  Product=octyl[2,2 - di(allyloxymethyl)butyl]-nitrophthalate.
(7) Anhydride=1,8-naphthalic anhydride
  Product=octyl[2,2 - di(allyloxymethyl)butyl] - 1,8-naphthalate.

*Example 8*

A suitable reaction vessel is charged with 100.1 grams (1.0 mol) of succinic anhydride and 226.0 grams (1.05 mols) of 1,1,1-trimethylol propane diallyl ether. The reaction mixture is heated to about 120° C. over a period of about one hour. There is then added 107 grams (1.06 mols) of triethylamine. Upon completion of the addition of the triethylamine to the mixture, 136.5 grams (1.08 mols) of benzyl chloride is added. The temperature of the reaction mixture is then maintained at about 140° C. for an additional two hours to ensure completion of the reaction. The resultant reaction mixture is washed several times with water and lye washes at 90° C. The reaction mixture is then steam sparged and dehydrated under vacuum. There is obtained 339.0 grams of benzyl [2,2-di(allyloxymethyl)butyl]succinate.

*Example 9*

Following the procedure of Example 8, 114.10 grams (1.0 mol) of glutaric anhydride, 226.0 grams (1.05 mols) of 1,1,1-trimethylolpropane diallyl ether, 106.0 grams (1.05 mols) of triethylamine and 326.0 grams (0.98 mol) of octadecyl bromide are utilized to prepare octadecyl [2,2-di(allyloxymethyl)butyl]glutarate in good yield.

*Example 10*

Following the procedure of Example 8, 98.06 grams (1.0 mol) of maleic anhydride, 226.0 grams (1.05 mols) of 1,1,1-trimethylol propane diallyl ether, 106.0 grams (1.05 mols) of triethylamine and 373.0 grams (0.98 mol) of octadecyl iodide are utilized to prepare octadecyl[2,2-di(allyloxymethyl)butyl]maleate in good yield.

*Example 11*

Following the procedure of Example 8, 112.08 grams (1.0 mol) of itaconic anhydride, 226.0 grams (1.05 mols) of 1,1,1-trimethylol propane diallyl ether, 106.0 grams (1.05 mols) of triethylamine and 138.0 grams (0.98 mol) of methylbenzyl chloride are utilized to prepare methylbenzyl[2,2-di(allyloxymethyl)butyl]itaconate in good yield.

*Example 12*

Following the procedure of Example 8, 162.15 grams (1.0 mol) of methyl phthalic anhydride, 226.0 grams (1.05 mols) of 1,1,1-trimethylol propane diallyl ether, 106.0 grams (1.05 mols) of triethylamine and 161.0 grams (0.98 mol) of butyl 3-chloropropionate are utilized to prepare (3-butoxycarbonyl)propyl[2,2-di(allyloxymethyl)butyl]methylphthalate in good yield.

*Example 13*

A suitable reaction vessel is charged with 148.1 grams (1.0 mol) of phthalic anhydride and 226.0 grams (1.05 mols) of 1,1,1-trimethylol propane diallyl ether. The mixture is heated to a temperature of about 115° C. There is then added 106.5 grams (1.05 mols) of triethylamine. After the addition of the triethylamine is complete, 223.0 grams (1.08 mols) of 2-ethylhexyl α-chloroacetate is added to the reaction mixture. The resulting mixture is held at a temperature of about 140° C. for about three hours and then washed with several lye and water washes at about 70° C. The reaction mixture is steam sparged and dehydrated under vacuum. There is obtained 501.4 grams of (2 - ethylhexoxycarbonyl)methylene[2,2 - di(allyloxymethyl)butyl]phthalate.

Example 14

Following the procedure of Example 13, 156.09 grams (1.0 mol) of aconitic anhydride, 226.0 grams (1.05 mols) of 1,1,1-trimethylol propane diallyl ether, 212.0 grams (2.10 mols of triethylamine and 248.0 grams (1.96 mols) of benzyl chloride are utilized to prepare dibenzyl[2,2-di-(allyloxymethyl)butyl]aconitate in good yield.

Example 15

In the procedure of Example 13, 167.0 grams (0.98 mol) of phenyl α-chloroacetate is substituted for the 2-ethylhexyl α-chloroacetate. There is obtained (phenoxycarbonyl)methylene[2,2-di(allyloxymethyl)butyl]phthalate in good yield.

Example 16

A suitable reaction vessel is charged with 98.06 grams (1.0 mol) of maleic anhydride, 226.0 grams (1.05 mols) of 1,1,1-trimethylol propane diallyl ether and 2 ml. of thionyl chloride. After the mixture has been allowed to react for about one hour, 106.0 grams (1.05 mols) of triethylamine and 124.0 grams (0.98 mol) of benzyl chloride are added. The reaction mixture is worked up in the manner described above, and there is obtained benzyl [2,2-di(allyloxymethyl)butyl]fumarate in high yield.

Example 17

Following the procedure of Example 8, 192.13 grams (1.0 mol) of trimellitic anhydride, 226.0 grams (1.05 mols) of 1,1,1-trimethylol propane diallyl ether, 212.0 grams (2.10 mols) of trimethylamine and 248.0 grams (1.96 mols) of benzyl chloride are utilized to prepare dibenzyl[2,2-di(allyloxymethyl)butyl]trimellitate in excellent yield.

Example 18

Following the procedure of Example 8, 218.12 grams (1.0 mol) of pyromellitic anhydride, 452.0 grams (2.10 mols) of 1,1,1-trimethylol propane diallyl ether, 212.0 grams (2.10 mols) of triethylamine and 248.0 grams (1.96 mols) of benzyl chloride are utilized to prepare dibenzyl di[2,2-di(allyloxymethyl)butyl]pyromellitate in good yield.

Examples 19–22

Following the procedure of Example 1, 1.0 mol of phthalic anhydride is substituted for the maleic anhydride, and 0.98 mol of an alkyl halide is substituted, as tabulated below, for the 1-bromooctane. The product obtained in each instance is as indicated.

(19) Alkyl halide=1-bromodecane
  Product=decyl[2,2 - di(allyloxymethyl)butyl]phthalate.
(20) Alkyl halide=butyl chloride
  Product=butyl[2,2 - di(allyloxymethyl)butyl]phthalate.
(21) Alkyl halide=butyl bromide
  Product=butyl[2,2 - di(allyloxymethyl)butyl]phthalate.
(22) Alkyl halide=octadecyl bromide
  Product=octadecyl[2,2 - di(allyloxymethyl)butyl]phthalate.

As previously stated, the products of this invention are useful as plasticizers for vinyl halide containing polymers. The advantageous properties possessed by the esters of this invention will be more fully understood by reference to the following examples.

The following testing procedures are used in evaluating the physical properties of plasticizers.

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably; i.e., plasticized polyvinyl chloride compositions that are flexible at room temperature often become very brittle and useless at lower temperatures. Low-temperature flexibility tests employed herein are according to the Clash-Berg Method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized composition's usefulness as an elastomer.

*Volatility.*—A decrease in plasticizer concentration, caused by volatilization of the plasticizer, often results in decreased flexibility of a plasticized polymer composition. Hence, plasticizers which are readily volatilized from the plasticized composition as a result of aging or heating are inefficient because, upon volatilization, the plasticized composition becomes stiff and hard. The test for plasticizer volatility employed herein is that described by the American Society for Testing Materials under the designation, D–1203–55T.

*Water-resistance.*—The amount of water absorption and the amount of water leaching that take place when the plasticized composition is immersed in distilled water for 24 hours is determined.

*Kerosene extraction.*—Resistance to kerosene is measured as follows: A 2″-diameter 40-mil disc is suspended in a 50° C. oven for a three-hour conditioning period to eliminate water, then cooled and weighed. The conditioned sample is then immersed in 400 ml. of kerosene for a period of 24 hours at 23° C. The sample is then removed from kerosene, blotted dry and suspended in a force draft 80° C. oven for four hours. The sample is then cooled and weighed. The percent loss in weight is reported as the kerosene extraction value.

*Hardness.*—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following example illustrates the advantageous and unexpected results which are achieved by the use of the esters of the present invention in vinyl halide containing polymers, but it is not intended that the invention be limited by or to such example.

Example 23

One hundred parts by weight of polyvinyl chloride and 60 parts by weight of (2-ethylhexoxycarbonyl)methylene [2,2-di(allyloxymethyl)butyl]phthalate, obtained in Example 13, are mixed on a rolling mill to a homogeneous blend. During the milling, substantially no fuming or discoloration is observed. Testing of the molded sheet for low-temperature flexibility, according to the procedure described above, gives a value of 2.3° C. A test of the volatility characteristics of the composition gives a value of 1.0%. Tests of the water resistance of the plasticized material show a loss of soluble matter of 0.01% and a 0.35% water absorption value. A test of the kerosene extraction characteristics of the composition gives a value of 2.3%. A Shore hardness value of 79 is obtained on this composition.

Other compounds within the scope of this invention are found to possess properties of a similar nature.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A compound selected from the group consisting of those having the formulae,

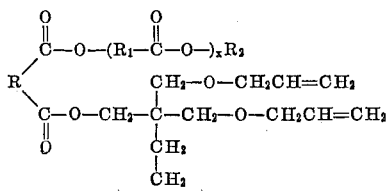

and

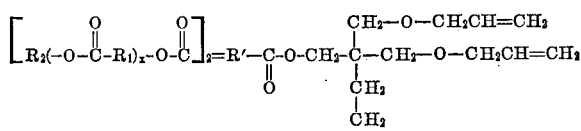

and

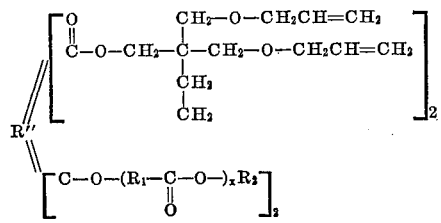

wherein:

R is a member of the group consisting of phenylene, alkyl substituted phenylene of 7 to 16 carbon atoms, halophenylene, nitrophenylene, cyclohexenylene, naphthylene, ethylene, trimethylene, alkyl subtituted ethylene of 3 to 12 carbon atoms, alkenyl substituted ethylene of 7 to 14 carbon atoms, vinylene, chlorovinylene, bromovinylene, 1-isopropenylene and 3-isopropenylene;

R' is a member of the group consisting of phenenyl and 1-propen-1,2,3-yl;

R" is benzenetetrayl;

$R_1$ is alkylene of 1 to 4 carbon atoms;

$R_2$ is a radical selected from the group consisting of alkyl of 1 to 20 carbon atoms, phenyl, benzyl and alkyl substituted benzyl of 8 to 11 carbon atoms; and $x$ is an integer from 0 to 1.

2. A compound of the formula,

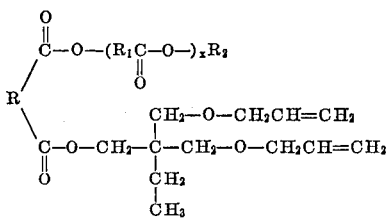

wherein:

R is a member of the group consisting of phenylene, alkyl substituted phenylene of 7 to 16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene;

$R_1$ is alkylene of 1 to 4 carbon atoms;

$R_2$ is a radical selected from the group consisting of alkyl of 1 to 20 carbon atoms, phenyl, benzyl and alkyl substituted benzyl of 8 to 11 carbon atoms; and $x$ is an integer from 0 to 1.

3. A compound of the formula,

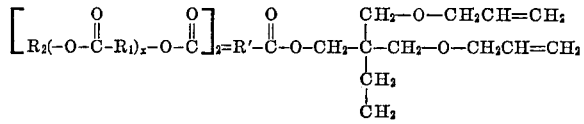

wherein:

R' is a member of the group consisting of phenenyl and 1-propen-1,2,3-yl;

$R_1$ is alkylene of 1 to 4 carbon atoms;

$R_2$ is a radical selected from the group consisting of alkyl of 1 to 20 carbon atoms, phenyl, benzyl and alkyl substituted benzyl of 8 to 11 carbon atoms; and $x$ is an integer from 0 to 1.

4. A compound of the formula,

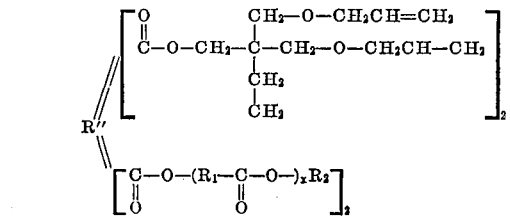

wherein:

R" is benzenetetrayl;

$R_1$ is alkylene of 1 to 4 carbon atoms;

$R_2$ is a radical selected from the group consisting of alkyl of 1 to 20 carbon atoms, phenyl, benzyl and alkyl substituted benzyl of 8 to 11 carbon atoms; and $x$ is an integer from 0 to 1.

5. Octyl[2,2-di(allyloxymethyl)butyl]maleate.

6. Benzyl[2,2-di(allyloxymethyl)butyl]succinate.

7. (2 - ethylhexoxycarbonyl)methylene[2,2 - di(allyloxymethyl)butyl]phthalate.

No references cited.

LORRAINE A. WEINBERGER, *Primary Examiner.*

T. GALLOWAY, *Assistant Examiner.*

UNITED STATES PATENT OFFICE
CERTIFICATE OF CORRECTION

Patent No. 3,336,363                            August 15, 1967

Dale R. Dill

It is hereby certified that error appears in the above numbered patent requiring correction and that the said Letters Patent should read as corrected below.

Column 7, lines 11 to 18 and lines 37 to 46, and column 8, lines 26 to 30 and lines 41 to 49, for that portion of each formula reading

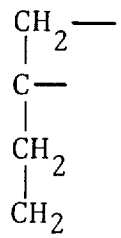      read      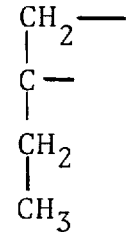

column 7, lines 37 to 46, for that portion of the formula reading

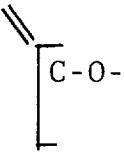      read      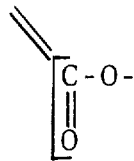

Signed and sealed this 25th day of June 1968.

(SEAL)
Attest:

EDWARD M. FLETCHER, JR.                     EDWARD J. BRENNER
Attesting Officer                             Commissioner of Patents